United States Patent Office 2,850,166
Patented Sept. 2, 1958

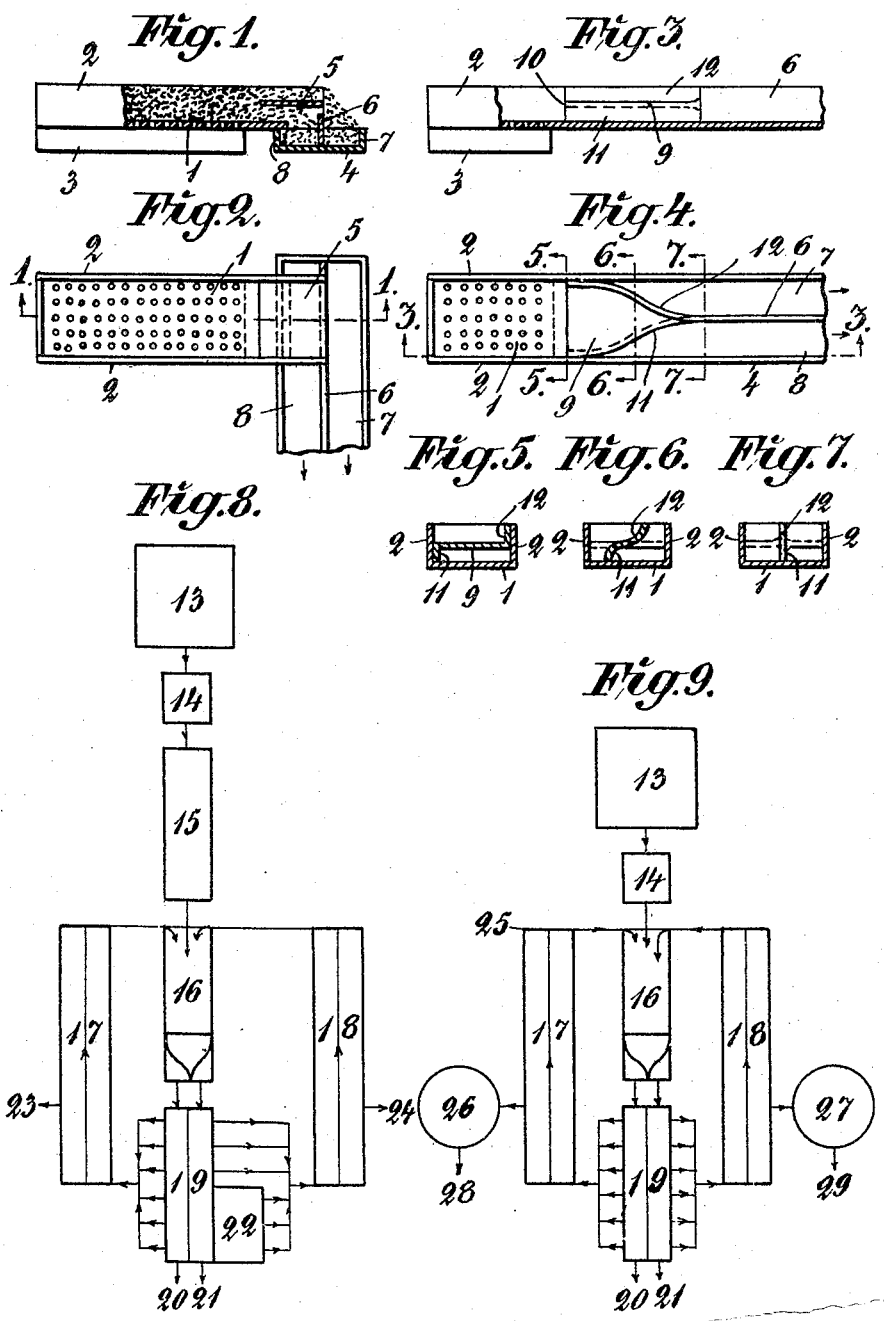

2,850,166

PROCEDURE AND MEANS FOR THE SEPARATION OF SOLID MATERIALS OF DIFFERENT SPECIFIC GRAVITIES ACCORDING TO THE SINK-AND-FLOAT METHOD

Karl Jonas Valter Svensson, Guldsmedshyttan, Sweden, assignor to Stripa Gruvaktiebolag, Ludvika, Sweden Application September 17, 1953, Serial No. 380,733

Claims priority, application Sweden December 4, 1952

4 Claims. (Cl. 209—422)

The present invention refers to a procedure for the separation of ore and gangue particles—or other mixtures of materials constituted by particles of different specific gravities—according to the sink-and-float method with the aid of a bed consisting of sand-sized particles of a suitable specific gravity and mixed with water or some other fluid, so that the medium of the bed will have approximately the same consistency as that of quicksand, the bed with its water content then having an apparent mean specific gravity between the specific gravity of the ore and the specific gravity of the gangue. The separation is carried into effect in a sloping or horizontal trough, said trough being shaken or vibrated in a manner such that the bed medium and the raw ore, which are both supplied at one end of the trough, move toward the other end thereof. Under suitable conditions, a separation of the raw ore takes place during the passage through the trough so that particles having a higher specific gravity than the apparent mean specific gravity prevailing in the bed collect at the bottom of the trough, whereas particles having a lower specific gravity than the apparent mean specific gravity prevailing in the bed float on the latter. In the proximity of the discharge end of the trough, the stream of materials passing through the trough is divided in two or a plurality of layers, which layers are taken out each separated. The division into two layers may be effected, for example, by a separating plate of the same width as that of the trough, being parallel to the bottom of the trough and at a suitable level above the same. By causing the separating plate and the sides of the trough to continue for a distance longer than that of the bottom of the trough, the layers of the material above and below the separating plate will be discharged from the trough at points separated from one another in the longitudinal direction. If it is desired to divide the stream of materials into more than two layers, this may obviously be effected, according to the same principle, with the aid of a plurality of separating plates. An important advantage of this arrangement is that it will be found easy with known mechanical means to cause the plates inserted into the trough to be raised and lowered by hand, so that the thickness of the various layers may be readily adapted to the composition of the stream of materials. In place of discharging the lower and the upper layer at points separated from one another in the longitudinal direction of the trough, it is desirable in many instances to make them float beside each other in the trough. This may be effected by forming the continuation of the separating plate in the direction of the stream as a guide blade adapted to force the upper layer toward one side of the trough and the lower layer toward the other side of the trough. The separating plate, horizontal from the beginning, then merges by degrees into a vertical partition dividing the trough lengthwise thereof. It is also possible to effect the same division with the aid of a guide blade system which is in principle the same as that which is used in Hooper's pneumatic jig. On the whole, it is as a rule possible, in principle, to apply the same means that are used in jigs to separate the various layers from one another.

The bed medium is then separated from the separated material, for instance by washing the mixture on a screen of such aperture that the bed medium passes through while the separated material remains as oversize, whereupon the bed medium is freed from superfluous water and returned to the feed end of the separating trough. As a rule, however, a portion of the bed medium should be cleaned prior to the dewatering from fine impurities brought into the bed medium during the sink-and-float separation, in order that the apparent mean specific gravity of the bed shall permit of being maintained reasonably constant.

In order that the separation of the heavy particles from the light ones shall permit of being effected as rapidly as possible in the separating trough, which is desirable from a capacity point of view, the apparent viscosity in the bed should be as low as possible. Factors exerting a considerable influence thereon are the shape and size of the bed medium particles, the porosity of the bed (that is to say that relative portion of the volume of the bed which is not filled by solid particles), and the intensity and direction of the vibrations. The bed medium particles should obviously be as spherical as possible. However, this factor is of less importance in practice than one might be inclined to believe at the first instance, for even if the particles should be rather uneven when supplied to the medium, they generally soon wear down to become rather round. Up to a certain limit, an increased size of the particles appears to make the bed increasingly readily movable. Too small a size of the bed medium particles should be avoided also with respect to the fact that such particles deposit too slowly and are consequently washed off by the superfluous fluid floating along the bed. The suitable interval with respect to the size of the bed medium particles is to be found between 0.05 and 5 millimeters, but as a rule particles from the whole of this interval are not available. The lower limit of the size of the particles controls itself, inasmuch as too fine particles are washed off, while the upper limit depends to a certain extent on the detailed lay-out of the process. The porosity of the bed need not in itself tell anything definite about the apparent viscosity of the bed. A factor better adapted to do this is the difference between the real porosity of the bed and the lowest porosity it can assume. The smaller this difference, the greater is the apparent viscosity. The lowest porosity the bed can assume is determined substantially by the shape and the size distribution of the bed medium particles. Rounded particles are thus understood to give a lower porosity than that given by sharp-cornered rough particles, and particles of a varying size give a lower porosity than do particles of a single size. Through the vibrations to which they are subjected in the separating trough the bed tends to pack together, the superfluous fluid to be found in the bed medium in the feeding-in of the same being then pressed out of the bed. However, the vibrations also result in the bed remaining rather readily movable in spite of said circumstance. As a rule, however, one should make special provisions to prevent the bed from packing together too much, or to loosen the bed at least during short intervals, inasmuch as the separation will otherwise proceed rather slowly. This may be effected, for instance, by spraying the fluid onto the bed from above at a considerable force, or by pressing the fluid through the bed from below, which may take place continuously or intermittently, or by a combination of these two methods. The second method has the advantage of permitting a control to a certain extent of the apparent mean specific gravity in the bed. Tests have actually shown that when a fluid is pressed through a bed, then the latter maintains approximately the same porosity as in the beginning, when the velocity of flow of the fluid is low, although the bed is thus made somewhat more mobile. If the velocity of flow is increased, a more or less sharp limit will be obtained, which rapidly causes the bed to become very mobile—the bed is then said to have become fluidized. This fluidized bed is stable within a certain velocity interval; if the velocity is increased therebeyond, the bed medium particles commence to follow with the fluid stream, while the bed is transformed into a suspension. Within the velocity interval wherein the fluidized bed exists, the porosity of the bed is increased approximately linearly with the velocity of flow of the fluid. Within this interval, the porosity of the bed may be varied from approximately 0.4 to approximately 0.5 on the condition that the bed material consists of reasonably rounded grains. In practice, the fluidized bed may be provided by the bottom of the trough being perforated, entirely or in part; the holes then obviously should not be larger but that the principal portion of the bed medium particles cannot penetrate through said holes. Beneath the perforated portion of the trough is secured an upwardly open box, to which the fluid is conducted through a rubber hose, a controllable valve and a pipe conduit from a larger container placed at a suitable level above the bed and having the liquid level kept constant therein with the aid of a float-operated cock. The velocity of flow of the fluid through the bed may then be simply controlled with the aid of the valve. If the stream of fluid is desired to be an intermittent stream, which in certain cases may offer advantages, this may be effected in the same manner as in pulsator jigs (Richard's, Pan-American).

The advantages of employing a procedure according to the invention by sink-and-float separations, against using the presently current methods, are above all that fewer and simpler machines are called for, as will be shown in the following with the guidance of practical examples, and that separations may be made at considerably higher specific gravities than previously, or, if it is desired to carry out separations at the same specific gravities as that used before, those a lighter and consequently cheaper material can be used for the preparation of the bed medium. The procedures as hitherto generally practised by sink-and-float separations are understood to imply that the separations take place in rather thin suspensions. In practical operation it is therefore hardly possible to keep a higher percentage of heavy particles in the medium than one of about 40 percent by volume. As will appear from the foregoing, it is possible to keep a percentage of about 60 percent by volume of solid particles in the bed. According to current practice by sink-and-float separations of heavy materials, the solid constituents of the medium generally consist of ferrosilicon with about 15% of Si or of magnetite or a mixture of both. The reason why these materials have been preferred is understood to reside, above all, in that they permit of being easily recovered and cleaned on account of their magnetic properties. Since the problems of the cleaning and the recovery of the medium are in principle the same in the procedure according to the invention and in the current methods, these materials are also suitable as bed mediums. With the current methods as now practised, it is hardly possible to use any higher apparent mean specific gravity of the medium, than one of approximately 2.6 with the sole use of magnetite, and one of approximately 3.4 with the sole use of ferrosilicon. In the employment of the procedure according to the invention, the bed may have an apparent mean specific gravity of up to approximately 3.4, when magnetite is being used, and up to approximately 4.5, when ferrosilicon is made use of. This is of an especially great practical importance in connection with sink-and-float separations of such magnetite-containing iron ores which, to yield an acceptable product, require that the separation takes place at a specific gravity of 3.0 to 3.4. According to current practice, one is constrained to use a ferrosilicon medium. By the fact that the magnetite worn off the ore is concentrated together with the ferrosilicon in the magnetic cleaning circuit and, therefore, accumulates in the medium, it will not be possible to maintain the specific gravity of the medium, if special measures are not resorted to for the purpose of cleaning the ferrosilicon from the magnetite. Hitherto, it has been possible to master this problem only when the percentage of magnetite in the ore is rather low, and the ore is hard and non-sliming, by the arrangement of an additional cleaning circuit for the medium, wherein the ferrosilicon is separated from the magnetite with shaking tables or with flotation. With the procedure according to the invention, this problem is entirely obviated, since a pure magnetite medium can be used.

In several cases inventors have endeavoured, by modifications of the current methods, to use the heavy constituents of the ore itself to provide a suspension for sink-and-float separation of the ore. This, however, has proved successful in exceptional cases only, inasmuch as the ore minerals are seldom sufficiently heavy to permit the production by the same of a reasonably liquid suspension of a sufficiently high apparent specific gravity to make the gangue float on said suspension. With the novel procedure considered herein, this difficulty is obviated as a rule, since a considerably higher apparent specific gravity can be maintained in a bed than in a suspension. What the practical proceedings are in a case like this will be explained more closely with reference to examples of applying the invention as well as with reference to the annexed diagrammatic drawing.

In the drawing, Fig. 1 represents a vertical section taken on line 1—1 of Fig. 2 of a form of embodiment of the separating trough and the washing screen connected thereto. Fig. 2 is a plan view of the same trough and washing screen. In a similar manner, Figs. 3 and 4 show a second form of embodiment of the separating trough and the washing screen pertaining thereto. Figs. 5, 6 and 7 are sections on lines 5—5, 6—6 and 7—7 in Fig. 4, respectively. Fig. 8 is a plan view of a suitable apparatus arrangement for effecting separation with the aid of a magnetic bed medium particularly made up for the purpose in view. Fig. 9 likewise is a plan view of another apparatus arrangement for the separation of a mixture of materials, wherein the fine-sized particles of the heavy constituent of the mixture make up the bed medium.

The separating trough shown in Figs. 1 and 2 is open at the top and at the right-hand end thereof, and has a plane bottom 1 and vertical walls on the sides 2 and at the left end thereof. The material to be separated is introduced at the left end and escapes at the right end, where it is received by a washing screen 4. Inserted into the latter end of the trough is a separating plate 5 paralleling the bottom 1 and extending transversely over the whole width of the trough. It is inserted approximately halfway of the height of the trough, and is preferably adjustable in the vertical direction. The washing screen 4 is divided into two parts by a vertical partition 6 located underneath the outer edge of the separating plate 5, so that the layer of material passing over the separating plate is being discharged into the right-hand part 7 of the screen 4, while the lower layer of material is being discharged into the left-hand part 8 of the screen 4. To this end, the front portion of the bottom 1 of the separating trough is cut away to form an opening, through which the material may flow down into the left-hand part 8 of the screen 4. The bottom 1 of the separating trough is preferably perforated, an upwardly open box 3 being provided immediately underneath the perforated part of the trough for the supply of liquid to the bed in the manner above described.

In the embodiment shown in Figs. 3 and 4, a guide blade is provided, by means of which the two layers of material may be deflected toward different sides in the transverse direction of the separating trough. The guide blade consists of a bulged plate 9 formed in a manner such as to serve at the same time as a separating plate to separate the upper and lower layers of material from each other. The edge 10 of the plate meeting the layer of material thus extends horizontally crosswise over the separating trough 1, 2 at a suitable level so that the ore particles can pass beneath the plate and the gangue particles can pass above the plate. The edges of the plate are bent so as to form flanges 11, 12 one 11 of which is directed downwardly and the other 12 upwardly, as will be seen from Fig. 5. These two flanges converge in a direction toward the outgoing end of the guide blade, as will be seen from Figs. 4 and 6, and merge into one at this end so as to form a vertical edge 11, 12, Fig. 7. The two material layers will thus leave the separating trough in the form of two paralleling strings of half the width of the separating trough but of the same height as that of the trough, and may in this manner be deflected to a washing screen 4, the parts 7, 8 of which extend in the same direction as the separating trough 1, 2. Here, the washing screen may be arranged to merge directly into the separating trough in order, perhaps, to constitute a continuation of the latter and provided with a partition 6.

In Fig. 8, 13 designates a bin, wherein the material to be separated is stored. The material should preferably have a maximum size of 60 millimeters. From the bin, the material is fed continuously with the aid of the feeder 14 out onto a washing screen 15, where particles smaller than about 5 millimeters are removed. Materials with a particle size larger than 5 millimeters enter the separating trough 16, to which dewatered bed medium from the classifiers 17 and 18 is also supplied. The bed medium is preferably applied immediately at the end of the separating trough, whereas the material is fed in at a distance inwardly of the trough, so that the bed will have time to form, before the material is applied. In this case, a magnetic bed medium (magnetite or ferrosilicon holding 15% Si) is made use of, the largest particle size of which is less than the smallest particle size of the material to be separated. In accordance with Figs. 3–7, the separating trough is fitted with a guide blade for the division of the stream of material, whereby the lower portion of the bed will be deflected together with the heavier particles to the left side of the trough, whereas the upper portion of the bed is deflected together with the lighter particles to the right side of the trough. The two streams of material thus obtained continue from the separating trough inwardly onto a washing screen 19 which is divided into two parts by a partition. Thus the washing screen will have such apertures that the bed medium particles but not the particles of the materials to be separated pass through. Thus the bed medium will be washed off on the washing screen, whereupon the finished heavy product presents itself at 20, while the finished light product appears at 21. The bed medium diluted with wash-water and obtained from the washing screen is caused to flow down, for the most part thereof, into the spiral classifiers 17 and 18. A portion of the bed medium obtained from the side of the washing screen on which the light product is treated is permitted, however, first to pass through a magnetic separator 22. With the aid of the separator non-magnetic particles are removed from the medium, such particles having been worn off the material subjected to treatment. By the fact that the bed medium from the light product is in this manner subjected to a magnetic separation, the worn off light and non-magnetic particles will be removed, above all, a feature which is desirable, inasmuch as these particles are the ones that mostly reduce the denseness of the bed. The non-magnetic product from the separator is preferably treated together with the material that has passed through the washing screen 15. The overflow material from the classifiers is taken out, as indicated by arrows 23, 24, and is used either directly, or after the sludge has been separated, as wash-water on the washing screens.

Modifications of the scheme of principles considered above are obviously possible. For example, it is not necessary to screen away materials of a particle size smaller than about 5 millimeters prior to the separation. All medium passing through on the right-hand side of the washing screen 19, where the light product is washed off, should in that case be cleaned magnetically, before it is permitted to flow down into the classifier 16. On the other hand, it is generally not necessary to purify the medium passing through on the left-hand side of the washing screen, where the heavy product is washed clean, inasmuch as the impurities entrained thereat are so heavy, as a rule, that the bed will still maintain a sufficient specific gravity. As pointed out before, it is also possible to select other means for the division of the bed into different layers, for instance by means of horizontal separating plates according to Figs. 1 and 2. The mechanical classifiers may also be replaced by pumps and thickeners.

In the arrangement shown in Fig. 9, wherein, as stated, the fine-sized particles of the heavy constituent of the mixture of materials to be separated make up the bed medium, the materials, which have preferably a maximum size of 60 millimeters, are fed out of the bin 13 by means of the feeder 14 and out onto the separating trough 16, to which dewatered bed medium is also supplied from the classifiers 17 and 18. Since, as will appear later on, the bed medium from the classifier 17 has a considerably higher specific gravity than the bed medium supplied from the classifier 18, the feeding-in onto the separating trough is effected so that bed medium is first supplied from the classifier 17, whereupon the material to be separated is supplied at a distance further inwardly of the trough, where a bed has had time to form, and immediately thereafter bed medium will be supplied from the classifier 18. When passing through the trough only the heavy particles are capable of penetrating down into the lower heavy bed layer, whereas the lighter particles remain staying in the upper lighter bed layer. In the limit region between the two layers, an amount of fine-sized heavy particles collect together with some coarse light particles. With the aid of the guide blade the upper light layer is brought at the end of the trough to the right-hand side of the trough, whereas the lower heavy layer is brought to the left-hand side. The abovementioned limit layer is removed together with the upper layer. The two products enter each on one side of the washing screen 19 divided into two, on which the fine-grained material is washed off and is later caused to flow down into the classifiers 17 and 18, as indicated in the figure. Where the return of the fine-grained heavy particles, that have found their way into the upper layer, to the separating trough is an object in view, while light particles should at the same time be prevented as far as possible from being entrained, a relatively fine-meshed screen is preferably provided on the right-hand side of the washing screen, where the light product is washed off. On the other hand, a relatively coarse screen should be provided on the left-hand side of the washing screen to ensure that a sufficient quantity of heavy bed medium shall always be available. Suitable mesh-widths are approximately 4 millimeters on the left-hand side of the washing screen, while mesh widths of 2 millimeters are appropriate on the right-hand side. The material not passing through the washing screen constitutes the finished product. In the drawing, 20 designates the outlet for the finished heavy product and 21 the outlet for the finished light product after the washing screen. Since new bed medium is continuously supplied to the process with the material to be separated, a small portion of the sand discharge from the classifier 17 may be taken out as a finished heavy product, as indicated at the numeral 25 in the drawing. The overflow material from the classifiers 17 and 18 is conveyed to thickeners 26 and 27. The material coming as an overflow from these thickeners is preferably used anew as washing water in the process. The bottom materials escaping at 28 and 29 from the thickeners may, upon further dewatering, be accepted, if necessary, as finished products, inasmuch as the material escaping at 28 substantially contains heavy particles, whereas the material escaping at 29 substantially holds light particles. If possible, however, they should be further cleaned by some other concentration method, such as flotation.

As stated in the foregoing example, many modifications—still rather self-evident to those skilled in the art—of the practical method of procedure are possible within the scope of the invention. However, the examples given should be entirely sufficient to clarify the inventive idea.

What is claimed is:

1. A process for the separation of raw crushed mineral and like material particles of different specific weight, comprising the steps of continuously feeding to one end of a container a separating medium consisting essentially of water and a granulated material the larger portion of which has a grain size between 0.05 and 5 mm., causing the granulated material to settle in the water to form an easily movable bed containing at least 50% by volume of said granulated material, continuously feeding the raw material particles to said bed whereby particles having a specific weight heavier than the bed sink to the bottom thereof while particles having a specific weight lighter than the bed float thereon, subjecting the container to vibration, causing substantially horizontal displacement of the bed with said particles from said one end of the container to a discharge end of the container, dividing the flowing bed into at least two superposed layers containing the heavier and the lighter particles, respectively, at said discharge end, separating the separating medium from said layers, removing water from the separating medium and feeding the dewatered separating medium back to said one end of the container.

2. The process of claim 1, wherein said bed contains about 60% by volume of solids.

3. The process of claim 1, wherein water is pressed through said bed to facilitate the separation.

4. In an apparatus for the separation of raw crushed mineral and like materials consisting of particles of different specific weight, which comprises a vibratory separating trough having a feed end and a discharge end: a water-containing separating medium in said trough and a separator plate having a forward edge extending transversely over the whole width of the trough in parallel to the bottom of the trough and further having two lateral flanges extending upwardly and downwardly, respectively, from the edge, the two flanges converging toward the end of the plate to form thereat a vertical partition.

References Cited in the file of this patent

UNITED STATES PATENTS

| 1,801,195 | Fraser | Apr. 14, 1931 |
| 2,303,367 | Kendall | Dec. 1, 1942 |
| 2,385,094 | Maynard | Sept. 18, 1945 |

FOREIGN PATENTS

| 100,140 | Australia | Jan. 19, 1937 |
| 114,393 | Australia | July 1, 1940 |
| 740,005 | Germany | Oct. 9, 1943 |